Feb. 4, 1969    G. LANGECKER    3,426,040
PROCESS OF PRODUCING TRIOXANE
Filed April 30, 1965

Inventor:
Gerhard Langecker
By: Spencer & Kay
Attorneys

United States Patent Office 3,426,040
Patented Feb. 4, 1969

3,426,040
PROCESS OF PRODUCING TRIOXANE
Gerhard Langecker, Cologne-Lindenthal, Germany, assignor to Josef Meissner Kommanditgesellschaft, Cologne-Bayenthal, Germany
Filed Apr. 30, 1965, Ser. No. 452,267
Claims priority, application Germany, May 2, 1964,
M 60,885
U.S. Cl. 260—340                                    10 Claims
Int. Cl. C07d 19/00

ABSTRACT OF THE DISCLOSURE

A process of producing trioxane. An aqueous formaldehyde feed solution is treated with an acid catalyst to form a reaction solution, a portion of which is vaporized to form a vapor in equilibrium with the reaction solution. This vapor is passed through a distillation column maintained under vacuum. Trioxane and water are recovered at the head of the column and separated formaldehyde is returned to the reaction solution.

---

The present invention relates to a process for the production of trioxane. More particularly, the invention concerns a method for the preparation of practically formaldehyde-free trioxane from formaldehyde, in a single process step.

Processes are known for the manufacture of a trioxane solution from an aqueous formaldehyde solution in presence of an acid catalyst, such as sulfuric acid.

These known processes are carried out in such a way that there is introduced a 60 to 80% formaldehyde solution, the reaction mixture is distilled at normal pressure, and trioxane solution is recovered at the head of the distillation column, which, however, still contains 30–50 parts of 20%–40% formaldehyde solution. If, however, there is collected at the head of the column a solution, the composition of which corresponds to the azeotrope, this solution contains about 65 parts of trioxane and about 35 parts of aqueous formaldehyde solution, which at about 30% solution contains only 25 parts of water. In this way per 75 parts trioxane and formaldehyde only 25 parts of water are drawn off, so that the sump contents are continuously depleted of formaldehyde. Moreover, the trioxane thus recovered must be subsequently separated from the formaldehyde solution, and the formaldehyde must be reconcentrated in an additional process step, for reuse.

The separation by means of extraction still permits a considerable residue of formaldehyde to remain in the organic solution, which must then be removed in additional processing steps, or which must be decomposed by the addition of auxiliary agents. Finally there is obtained in the sump with the known methods, a formaldehyde solution, the concentration of which is always below that of the feed solution, so that this formaldehyde solution must also be reconcentrated for reuse.

It is, therefore, an object of the present invention to provide a way in which to obtain in the earliest stages of trioxane manufacture a trioxane solution which is practically free from formaldehyde so that the afore-mentioned disadvantages can be avoided. It has now been found, surprisingly and unexpectedly, that not only are the foregoing disadvantages avoided, but in addition further advantages are achieved by removing the trioxane from the reaction mixture in continuous distillation. In accordance with the invention, this can be carried out in such a manner that the vapors in equilibrium with the reaction solution are fed to a distillation apparatus maintained under vacuum, so that the formaldehyde remains in the sump, and whereby there are recovered at the head of the distillation column only trioxane and water. In this way, the formation of the trioxane and the separation thereof from formaldehyde are carried out in a single process step, and so completely that the trioxane solution thus produced is practically free from formaldehyde.

The foregoing is the major advantage, but the novel method of the invention possesses the following additional advantages. The method of the invention, by permitting a choice of individual operating conditions, such as pressure, temperature, distillation, velocity, and the like, makes it possible to remove at the head of the distillation column any desired proportion of water, so that for example, by carrying out the process, there can be produced at the head of the column a water content which is greater than that of the formaldehyde solution feed so that in the reactor or in the sump there takes place a steady reconcentration of the reaction solution. This can continue until there is attained, either in the reactor or in the sump, a formaldehyde concentration which assures the desired velocity of formation of the trioxane in the performance of the process. Accordingly the water fraction withdrawn from the head of the column is regulated in such manner that it corresponds to that of the formaldehyde feed solution.

In this manner, it is possible to remove from the head of the distillation column not only formaldehyde-free trioxane solution, but also to recover a highly concentrated trioxane solution, for example 60% or even 70% solution, depending upon the concentration of the formaldehyde feed solution.

If, accordingly, there is fed to the reactor a formaldehyde solution having a water content higher than that which prevails in the reactor, and if there is also taken off at the head of the distillation column a correspondingly higher water fraction, there is thus obtained a dilute trioxane solution; this permits the process to be carried out with one of the commercially available formaldehyde solutions, or even with a formaldehyde solution of lower concentration, without any special equipment being required for reconcentration of the formaldehyde fed back to the reactor concentration or to the sump concentration, respectively, since the concentration in the reactor or sump does not change. Therefore, in accordance with the process of the invention, a higher concentration of formaldehyde is possible in either the reactor or the sump, where the formaldehyde feed exhibits a high water content, so that in accordance with the process of the invention, a high velocity of formation of trioxane in the reactor is always produced.

If it is desired to conduct the distillation under vacuum, this need not mean that the entire distillation apparatus must be kept under reduced pressure, but simply that particular portions can be maintained under high, normal or slightly above normal pressure. On the contrary, it has proved to be especially advantageous to maintain a pressure drop between the head and the sump of the distillation apparatus, which can vary from the working pressure of the distillation to normal or slightly above normal pressure, to achieve the most favorable velocity of formation of the trioxane.

In order to attain the desired high velocity of formation of the trioxane, a high formaldehyde concentration and/or high sump or reactor temperatures are necessary. These must, however, be kept within limits in order to avoid separation of paraformaldehyde in the reaction solution.

If the objective is to attain a maximum velocity of formation of trioxane with proportionately high reactor or sump concentrations, it is desirable to maintain in the reactor or the sump at least the distillation pressure, or better still, even higher pressure, when indeed not working at normal or excess pressure. In this way, the formaldehyde can be held directly at a relatively high concentration, by establishing an increasing pressure gradient between the head of the column and the sump thereof.

The principle of the invention makes it possible, in industrial operation, by the use of a pressure differential between the reactor or the sump on the one hand, and the solid or packing portion of the distillation apparatus on the other hand, to accomplish reconcentration of the formaldehyde found in the vapor above the reaction solution to the concentration prevailing in the reactor or in the sump. Thus there exist in the sump or the reactor considerably higher temperatures than in the distillation portions of the apparatus; this prevents the separation of paraformaldehyde.

If vacuum distillation is properly employed, in accordance with the invention, it becomes possible in a single process step not only to obtain formaldehyde-free trioxane at the head of the distillation apparatus in a wide range of possible concentrations, and to produce in the reactor or sump the formaldehyde concentration which is optimum for the process directly, but also in the same single stage process to reconcentrate the formaldehyde returning to the reactor or sump to such an extent that no further additional reconcentration for reuse outside the apparatus is required. Thus every available commercial concentration of formaldehyde solution may be employed without the use of additional process stages.

Although the process of the invention may be carried out in a wide range of conventional equipment, such as that shown in the accompanying drawings, and can be performed continuously or in batch operation, the drawings depict a type of apparatus which is especially suitable therefor.

Thus, on the basis of the foregoing considerations, it is advantageous, in contrast to the forced circulation of the solution between a low placed reactor and a high placed distillation portion by means of large pumps, to separate the reactor or sump portion and the distillation portion, to carry out the partial vaporization in this reactor, which is under normal to excess pressure, and to return the formaldehyde solution to this reactor via the distillation apparatus maintained under vacuum.

Additional objects and advantages of the present invention will become apparent upon consideration of the following description when taken in conjunction with the accompanying drawings in which.

In the drawings and examples, like reference numerals designate similar portions of the apparatus.

Figures 1, 2:
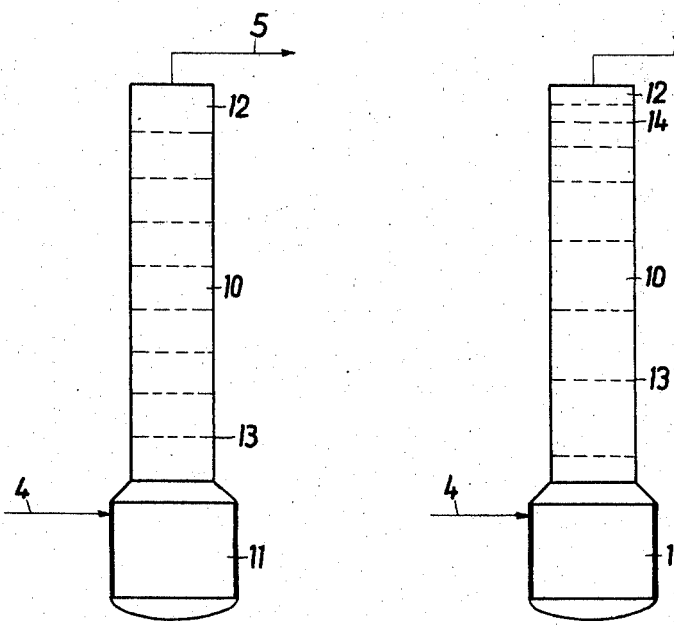
FIGURE 1 is a distillation arrangement for operation without pressure differentials.
FIGURE 2 shows another embodiment of the invention, in which the sump of the column is coincident with the reactor, and the distillation apparatus contains asymmetrically sized packing segments upon the individual plates to produce a pressure drop within the column.

Referring to FIGURE 1, there is shown a distillation apparatus 10 in which the numeral 11 designates a sump or reactor portion, wherein the reactants, namely, a solution of formaldehyde and a catalyst, such as sulfuric acid or phosphoric acid, are introduced via an inlet pipe 4. The entire apparatus 10 and sump 11 and head portion 12 is maintained under the same reduced pressure. Trioxane is formed within the reactor, which is evaporated with a portion of the water and the unconverted formaldehyde, passing upward through plates 13 in the column. At the head 12 of the column, practically formaldehyde-free trioxane solution is recovered via conduit 5. Formaldehyde distilled with the trioxane returns as a reflux through the plates 13, returning to the sump.

Any desired concentration of formaldehyde can be fed, as long as the sump temperature does not exceed the limits for separation of paraformaldehyde. The sump temperature is dependent on the operating pressure, which determines the boiling point of the reaction mixture. The operating pressure with this type of apparatus will range between about 0.3 and 0.5 atmosphere absolute. The number of plates must be chosen to correspond. Moreover, this apparatus permits a sump concentration of about 40% to 45% of formaldehyde at most. In conventional processes this apparatus is operated at atmospheric pressure whereby the disadvantages previously described occur.

The embodiment of FIGURE 2 permits different packing heights between plates 13 and 14. This means that in this column operation is carried out with a pressure drop, i.e., if at plate 12 of the column a reduced pressure of, for example, 0.3 atmosphere absolute is maintained, a pressure of 0.7 to 1.0 atmosphere absolute can be attained in the sump 11 by regulating the packing height of the plates. This has the advantage over the arrangement of FIGURE 1 that the boiling point of the reaction mixture in sump or reactor 11 is considerably increased, so that thus higher formaldehyde concentrations of about 45% to 60% are attainable in the sump, although the same formaldehyde solution as in the arrangement of FIGURE 1 can be introduced through the pipe 4.

In order to increase still further the velocity of formation of trioxane limited by sump temperature and formaldehyde concentration, it is possible, in accordance with the invention, to separate a portion of the sump from the conventional apparatus by the use of a barometric leg, and to place this portion so low that it stands under higher pressure than the distillation column and the upper portion of the sump.

Figure 3:
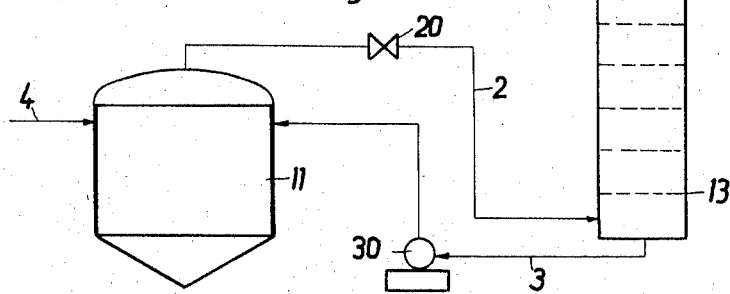
FIGURE 3 shows an apparatus in which the reactor and the distillation column are locally separated.

An arrangement of this type is shown in FIGURE 3. The reactants are fed into the reactor 11 through inlet pipe 4, said reactor being capable of being regarded as a sump in this type of apparatus. In this reactor, the prevailing pressure is atmospheric or higher. A portion of the solution is distilled in reactor 11 and the vapors pass through pipe 2 and through a butterfly valve 20 to the lower portion of distillation column 10, which is operated at a pressure of about 0.3 atmosphere absolute. Above the plates 13, which preferably all contain the same packing height, there pass vapors of trioxane and water, which are removed via pipe 5. The formaldehyde flows downward, leaving the column via pipe 3, and is returned to reactor 11 via pump 30.

In starting up this arrangement, an aqueous formaldehyde solution of definite concentration, for example 30%, and the selected catalyst in definite proportion, are introduced into the reactor via pipe 4, and an amount is distilled from the reaction mixture sufficient to bring the reactor 11 to the desired pressure, for example, atmospheric pressure. Trioxane solution having a higher water content than that of the formaldehyde solution feed is removed at the head 12 of column 10, e.g. 20% water content, and the returning formaldehyde solution is carried directly back to the reactor for a period of time until the solution in the reactor reaches a concentration of about 60% to 70%, namely that concentration which under the selected conditions produces the optimum formation velocity of trioxane. Thereby there is recovered from the head 12 of the column a trioxane solution of a concentration of that of the formaldehyde fed in, which in this illustrative example, is about 30%.

If instead of a 30% formaldehyde feed, a 40% or 60% formaldehyde solution feed is employed, the reconcentration process can be accelerated by withdrawing, for example, a 20% trioxane solution, and after reaching the selected sump concentration of formaldehyde, a 40% to 60% trioxane solution can be recovered from the head 12 of the column. Here also by use of a difference in height of about 7 meters between the liquid level in reactor 11 and the first plate of the column 10, it is possible, by maintaining atmospheric pressure in the reactor, to eliminate pump 30.

The following is an illustrative and not limitative example of a complete process according to the present invention.

The reactor 11 was arranged 7.5 meters below the sump of a 25-plate distillation column 10, so that with an operating pressure of between 0.85 and 0.9 atmosphere absolute in the reactor 11 and an operating pressure of 0.3 atmosphere absolute in the distillation column 10, the solution coming from the column 10 flowed to the reactor 11 through the line 3 under the influence of the increase in barometric pressure.

The reactor 11 was charged with 37% by weight formaldehyde solution, which contained 2% by weight of sulfuric acid. At the start of the distillation, both the reactor 11 and the distillation column 10 were under the same pressure of 0.3 atmosphere absolute, and this pressure was maintained until the formaldehyde contents in the reactor 11 reached about 45%, at which point the separation of the formaldehyde was feared to be imminent. With a small amount of reflux, a 12% by weight formaldehyde solution was taken from the head of the distillation column, which first contained only traces and then small amounts of trioxane.

The volumn of the solution in the reactor was maintained constant by the continuous addition of 37% by weight formaldehyde solution.

The pressure in the reactor was then increased to 0.9 atmosphere absolute by closing the valve 20 in the line 2 between the reactor 11 and the distillation column 10, so that the temperature in the reactor settled to between 92 and 98° C. The trioxane contents of the distillate gradually increased with increasing formaldehyde concentration in the reactor, until, finally, the desired operating conditions were reached when the formaldehyde contents was between 55 and 60% by weight. With the reflux ratio being 1:2, the hourly yield of distillate was 9 kg., which contained 12% by weight formaldehyde and 32 to 34% by weight trioxane. This corresponded to an average addition of 11 kg. of 37% by weight formaldehyde solution to the reactor.

The 12% by weight formaldehyde contents can be reduced, to a large extent, by increasing the number of plates in the distillation column.

It will be understood that the above description of the present invention is susceptible to various modifications, changes and adaptations, and the same are intended to be comprehended within the meaning and range of equivalents of the appended claims.

What is claimed is:

1. Process for the production of trioxane comprising the steps of: treating aqueous formaldehyde feed solution with an acid catalyst to form a reaction solution; vaporizing a portion of said reaction solution for forming vapor in equilibrium with said reaction solution; passing said vapor through a distillation column maintained under vacuum; recovering trioxane and water at the head of said column; and returning separated formaldehyde to said reaction solution.

2. The process of claim 1 in which the proportion of water withdrawn at the head of the distillation column corresponds to that of the formaldehyde feed solution.

3. The process of claim 1 in which an increasing pressure gradient is maintained from the head of the distillation column to the sump thereof.

4. The process of claim 1 in which the distillation is carried out at the same reduced pressure throughout, and in which the pressure on the reaction solution is higher than the distillation pressure.

5. The process of claim 3 in which the pressure gradient is constant.

6. The process of claim 3 in which the pressure gradient is variable.

7. The process of claim 1 in which the pressure on the reaction solution is atmospheric.

8. The process of claim 1 in which the operating pressure lies between about 0.3 and about 0.5 atmosphere absolute.

9. The process of claim 3 in which the pressure at the top of the column is about 0.3 atmosphere absolute and at the bottom of the column between about 0.7 and 1.0 atmosphere absolute.

10. The process of claim 1 in which trioxane solution having a water content higher than that of the formaldehyde feed solution is recovered until there is attained, in a reactor in which the feed solution is treated with the acid catalyst, a formaldehyde concentration which brings about 60 to 70% trioxane formation.

No references cited.

NORMA S. MILESTONE, *Primary Examiner.*

U.S. Cl. X.R.

202—40